(12) United States Patent
Abrahamsen et al.

(10) Patent No.: US 8,104,250 B2
(45) Date of Patent: Jan. 31, 2012

(54) APPARATUS FOR USE IN AND METHOD OF ATTACHING CAP-FORM FITMENTS TO CONTAINERS

(75) Inventors: Morten Abrahamsen, Åros (NO); William Lee Clack, East Lansing, MI (US); Michael Dale Clayton, Lake Orion, MI (US); Anthony John Lukasiewicz, Howell, MI (US)

(73) Assignee: Elopak Systems AG, Glattbrugg (CH)

( * ) Notice: Subject to any disclaimer, the term of this patent is extended or adjusted under 35 U.S.C. 154(b) by 794 days.

(21) Appl. No.: 11/667,801

(22) PCT Filed: Nov. 16, 2005

(86) PCT No.: PCT/GB2005/004395
§ 371 (c)(1),
(2), (4) Date: Mar. 10, 2008

(87) PCT Pub. No.: WO2006/054061
PCT Pub. Date: May 26, 2006

(65) Prior Publication Data
US 2010/0004108 A1  Jan. 7, 2010

Related U.S. Application Data (60) Provisional application No. 60/628,317, filed on Nov. 16, 2004.

(51) Int. Cl.
*B65B 61/18* (2006.01)
(52) U.S. Cl. ........ 53/410; 53/133.2; 53/DIG. 2; 156/69; 493/87
(58) Field of Classification Search .................. 53/133.2, 53/410, 563, DIG. 2; 493/87; 156/69
See application file for complete search history.

(56) References Cited

U.S. PATENT DOCUMENTS

| 3,434,908 | A | * | 3/1969 | MacDonald | 156/514 |
|---|---|---|---|---|---|
| 4,695,337 | A | * | 9/1987 | Christine | 156/69 |
| 4,767,478 | A | * | 8/1988 | Christine | 156/69 |
| 4,788,811 | A | | 12/1988 | Kawajiri et al. | |
| 5,058,360 | A | * | 10/1991 | Yamazaki et al. | 53/133.2 |
| 5,203,819 | A | * | 4/1993 | Gleason | 53/133.2 |
| 5,267,934 | A | * | 12/1993 | Pape et al. | 493/87 |

(Continued)

FOREIGN PATENT DOCUMENTS

| EP | 450 146 | 10/1991 |
|---|---|---|
| EP | 620 152 | 10/1994 |
| EP | 693 426 | 1/1996 |
| EP | 819 611 | 1/1998 |
| EP | 858 390 | 8/1998 |

(Continued)

*Primary Examiner* — Thanh Truong
(74) *Attorney, Agent, or Firm* — Warn Partners, P.C.

(57) ABSTRACT

An applicator (10*a*) affixes fitments (12) to paperboard cartons (20), each fitment (12) comprising a screw cap on a pour spout. An ultrasonic horn (18) reciprocates between a retracted position for receiving a fitment (12) and an advanced position for depositing the fitment (12) on an outer surface of a carton (20). A duct (26) extends and provides fluid communication between an air handler and a fitment-holding recess (30) formed in the horn (18). The air handler is actuable to evacuate the duct (26) to retain a fitment (12) in the recess (30) by suction while transporting the fitment (12) to be affixed to the container wall. The air handler also supplies pressurized gas to the duct (26) to blow the fitment (12) from the horn (18) before the horn returns to the retracted position. A receiver reciprocates between a pick-up position for receiving a fitment (12) and a delivery position for passing the fitment (12) to the horn (18), the receiver comprising a head (34*c*) with a suction opening (40*a*) formed in the end portion thereof for communication with the interior of the fitment.

5 Claims, 10 Drawing Sheets

U.S. PATENT DOCUMENTS

| | | | |
|---|---|---|---|
| 5,435,803 A * | 7/1995 | Owen et al. | 493/87 |
| 5,473,857 A | 12/1995 | Keeler | |
| 5,484,374 A | 1/1996 | Bachner et al. | |
| 5,492,592 A | 2/1996 | Bergholtz et al. | |
| 5,653,832 A | 8/1997 | Thompson et al. | |
| 5,819,504 A | 10/1998 | Giacomelli et al. | |
| 5,983,599 A * | 11/1999 | Krueger | 53/410 |
| 6,085,489 A | 7/2000 | Bachner et al. | |
| 6,125,610 A | 10/2000 | Mogard et al. | |
| 6,231,491 B1 | 5/2001 | Adams et al. | |
| 6,464,096 B2 * | 10/2002 | Adams et al. | 220/258.2 |

FOREIGN PATENT DOCUMENTS

| | | |
|---|---|---|
| EP | 1 227 041 | 7/2002 |
| JP | 10-286 894 | 10/1998 |
| JP | 2003-053859 | 2/2003 |
| WO | WO 92/14604 | 9/1992 |
| WO | WO 96/23699 | 8/1996 |
| WO | WO 99/29152 | 6/1999 |
| WO | WO 99/51428 | 10/1999 |
| WO | WO 01/07332 | 2/2001 |
| WO | WO 2004/058574 | 7/2004 |

* cited by examiner

APPARATUS FOR USE IN AND METHOD OF ATTACHING CAP-FORM FITMENTS TO CONTAINERS

RELATED APPLICATIONS

The present application is the U.S. national phase entry of PCT/GB2005/004395 with an international filing date of Nov. 16, 2005 and claims priority from U.S. Provisional Patent Application Ser. No. 60/628,317, filed Nov. 16, 2004 which is incorporated by reference in its entirety.

This invention relates generally to apparatus and methods for use in applying fitments, particularly pour spout fitments, to containers.

Applicators are known for ultrasonically welding plastics, screw-threaded pour spout fitments to plastics-coated paperboard cartons from the insides of open tops of the cartons. The applicator may include a member rotating about a horizontal axis and comprised of a plurality of arms extending from a hub, each arm carrying near its outer end a horizontally protruding head for receiving the fitment. The fitment usually consists of a screw cap screwed onto a flanged, externally-threaded, pour spout. As the member rotates, a fitment on the head is transported by the arm to a position co-axial with an ultrasonic welding horn formed co-axially at its free end with a recess. Then the member is advanced along its axis of rotation to introduce the fitment into a hole through the wall of a carton until the flange arrives at the inside surface of the wall. With the fitment in that position, the ultrasonic horn is advanced to receive, with clearance, the cap, the threaded part of the pour spout, and the head and vibratingly presses together, between its free end and an annular surface portion of the arm, the flange and the carton wall so as to weld the flange to the inside of the wall.

An applicator of this type is disclosed in U.S. Pat. No. 5,484,374, with the head being provided by a spigot which is fixed in a shallow bore in the arm portion, and an annular surface portion of the arm portion itself providing the weld back-up support. The rotatable and translatable member picks up fitments in turn from an escapement mechanism which feeds fitments in turn to the bottom of an escapement slot. To ensure that the fitment at the bottom of the slot remains in its proper position while resting at the bottom of the slot, a vacuum source may be provided which imparts a suction force through an aperture located on the inside of the escapement base and thereby holds the fitment firmly against the aperture. This force prevents the fitment from bouncing upon impact with the bottom of the escapement slot.

An applicator very similar to that of U.S. Pat. No. 5,484,374 is disclosed in U.S. Pat. No. 6,085,489, except that no mention is made of use of a vacuum source and that, disposed on the front face of each arm of the rotatable and translatable member, is a circular anvil and a head extending perpendicularly from the front face of the anvil. The head can be either machined on the surface of the anvil or secured to that surface by means of a machine bolt. Likewise, each anvil or anvil/head combination can either be machined as an integral part of an anvil housing of the arm or, preferably, be secured to the anvil housing by means of a machine bolt.

WO-A-2004/058574 discloses an applicator very similar to that of U.S. Pat. No. 6,085,489.

U.S. Pat. No. 4,788,811 discloses an apparatus for the successive production of paper packages fitted with respective pour spout fitments on the top end portions thereof and filled with a liquid drink. Each fitment includes a spout having a generally cylindrical external configuration and formed therethrough with a pouring passage temporarily closed or valved, and an attaching flange permanently fixed to the inner end of the spout. The fitment is introduced horizontally into the open end of a partially completed package from inside thereof. The spout introduction and attaching step is carried out before bottom-closing and sealing. A spout-insertion unit mounted at a position in horizontal alignment with the specific partially completed package comprises a sucker bracket for holding suckingly a spout; a horizontal bar movable transversely relative to the axis of the partially completed package and mounting the sucker bracket; and a piston-and-cylinder unit which positions the sucker through the intermediary of the horizontal bar.

U.S. Pat. No. 5,492,592 discloses an apparatus which is for arranging a closable pouring device with respect to a hole in the end of a pack body which is formed of two deep-drawn half shells. The apparatus includes a mandrel wheel which is rotated intermittently about an axis of rotation. The mandrel wheel is provided with four mandrels which project radially from a hub. Arranged in the region of the outer periphery of the mandrel wheel at angular spacings with respect to the axis of rotation are a set-down station and adjacent heating stations, followed by a sealing station and a stripper station in such a way that the outer end of each mandrel is capable of co-operating in a step-wise manner with the stations successively. The pouring device can be held to the outer end of the mandrel by a mechanical clamping effect. However, a vacuum pipe can also be used to hold the pouring device by vacuum effect to the outer end of the mandrel.

In those cases where heads are employed to receive the pour spout fitments as friction fits over them, the internal diameter of the pour spout fitments may vary for a number of reasons. One is that a variety of internal diameters for the spout are commercially specified and these may differ only slightly in diameter. Moreover, even fitments, which are usually injection-moulded from plastics, having nominally identical internal diameters of their spouts, may vary in that internal diameter from production batch to production batch, depending upon the production circumstances and tolerances. The ambient temperature also has an influence on that diameter. Thus, some fitments may be very tightly mounted over the spigot heads and therefore difficult to remove, whilst others may be very loosely mounted over the spigot heads and so tend to fall off.

It is also known to affix pour spout fitments to exterior wall surfaces of plastics-coated paperboard cartons. For example U.S. Pat. No. 5,473,857 discloses a method and apparatus for affixing fitments to such cartons in which a fitment applicator anvil is slidably supported for reciprocal motion between a retracted position for engaging a fitment held in an escapement at the exit end of a gravity feed track and an advanced position for pushing the fitment axially of itself through a slot in a back wall of escapement and depositing the fitment on an outer surface of a carton. A fitment applicator cylinder is drivingly connected to the applicator anvil and drives the applicator anvil between the retracted and advanced positions. Vacuum ducts extend and provide fluid communication between a reversible vacuum blower and a fitment holder recess formed in the applicator anvil. The vacuum blower is actuable to evacuate the ducts to retain a fitment in the fitment holder recess of the applicator anvil by suction during transport of the fitment from the retracted position to the advanced position. The reversible vacuum blower is also actuable to reverse air flow and blow air under pressure into the ducts to blow the fitment from the anvil before the applicator anvil returns to the retracted position so that the applicator anvil is prevented from carrying the fitment back to the retracted position. However, that apparatus is unable to apply fitments to open-topped containers since, among other things, it does not disclose a structure to provide back-up support from within the containers for the application of fitments to the outsides of such containers. Neither can that apparatus use an ultrasonic sealing horn as an applicator anvil since, among other reasons, an ultrasonic sealing horn must be generally co-extensive with the fitment flange and therefore would not allow fitment flanges to flex as is necessary for fitments to be pushed through the slot in the back wall of the escapement.

According to one aspect of the present invention, there is provided apparatus for use in attaching a cap-form fitment to a container, comprising a support, a head projecting transversely from said support for receiving said fitment over a free end portion thereof, and a suction opening formed in said end portion for communicating with at least a part of the interior of said fitment, which part is bounded by an end wall of said interior.

According to a second aspect of the present invention, there is provided a method of applying a cap-form fitment to a container, including causing the fitment to be received over a free end portion of an element, and producing suction between said end portion and an end wall of the interior of said fitment, thereby to promote retention of said fitment on said end portion.

Owing to those aspects of the invention, it is possible to cope with slight variations in the internal widths of the fitments, in particular by making the maximum external width of the head or element just slightly undersized relative to the minimum expected internal width of the fitments, so relying upon the suction effect to retain the fitments upon the head or element.

If heat is used in attaching the fitments to the containers, then the suction-induced air flow through the head or element has a useful cooling effect. Moreover, dust in the region of the head or element is drawn away by the suction, which thereby helps to keep that region clean.

According to a third aspect of the present invention, there is provided apparatus for use in attaching a cap-form fitment to a container, said apparatus including an arm, an internally threaded blind bore formed transversely in said arm, and an externally threaded spigot screwed into said bore and including a free end portion for receiving said fitment thereover.

Owing to that aspect of the invention, the spigot can be readily replaceable and yet the use of a machine bolt dispensed with.

According to a fourth aspect of the present invention, there is provided apparatus for affixing a fitment to an outside surface of a container, comprising:
    an ultrasonic sealing horn,
    a holding end of said horn for holding said fitment and for pressing said fitment against said outside surface,
    a drive arrangement arranged to produce relative movement between said container and said horn to cause said fitment to be pressed against said surface, and
    a loading device which serves to load said fitment onto said holding end.

According to a fifth aspect of the present invention, there is provided a method of affixing a fitment to an outside surface of a container, comprising:
    loading said fitment onto a fitment holding end of an ultrasonic sealing horn,
    producing relative movement between said container and said horn to cause said fitment to be pressed against said surface, and
    ultrasonically affixing said fitment to said surface.

According to a sixth aspect of the present invention, there is provided apparatus for affixing fitments to containers where each fitment includes a cap screwed onto a circumferentially-flanged cylindrical pour spout, the apparatus comprising:
    a fitment-applying device slidably supported for reciprocal axial motion between a retracted position for receiving a fitment and an advanced position for depositing the fitment on a container wall;
    a duct extending and providing fluid communication between a gas handler and a fitment-holding recess formed in the fitment-applying device, the handler being actuable to evacuate the duct so as to retain a fitment in the fitment-holding recess of the fitment-applying device by suction while transporting the fitment to be affixed to the container wall, the handler being further actuable to supply pressurized gas to the duct in such a way as to blow the fitment from the fitment-applying device before the fitment-applying device returns to the retracted position; and
    a receiver supported for reciprocal motion between a pick-up position for receiving a fitment and a delivery position for passing the fitment to the fitment-applying device.

According to a seventh aspect of the present invention, there is provided a method for affixing a fitment to a where the fitment includes a screw cap on a circumferentially-flanged cylindrical pour spout, the method including the steps of:
    pushing a fitment from a feed track into a fitment receptacle of a receiver;
    axially aligning the fitment with a fitment-applying device;
    moving the fitment from the receptacle to a second fitment receptacle of the device by expelling gas from within the receiver;
    moving a carton into position for fitment attachment;
    lowering a back-up anvil into the carton;
    moving the fitment-applying device towards the carton and into contact with the circumferential flange of the fitment; and
    ultrasonically welding the fitment to the carton.

Owing to those aspects of the invention, it is possible to affix fitments to the exteriors of open-topped cartons, and in particular to use an ultrasonic sealing horn as a fitment-applying device.

Figure 1:
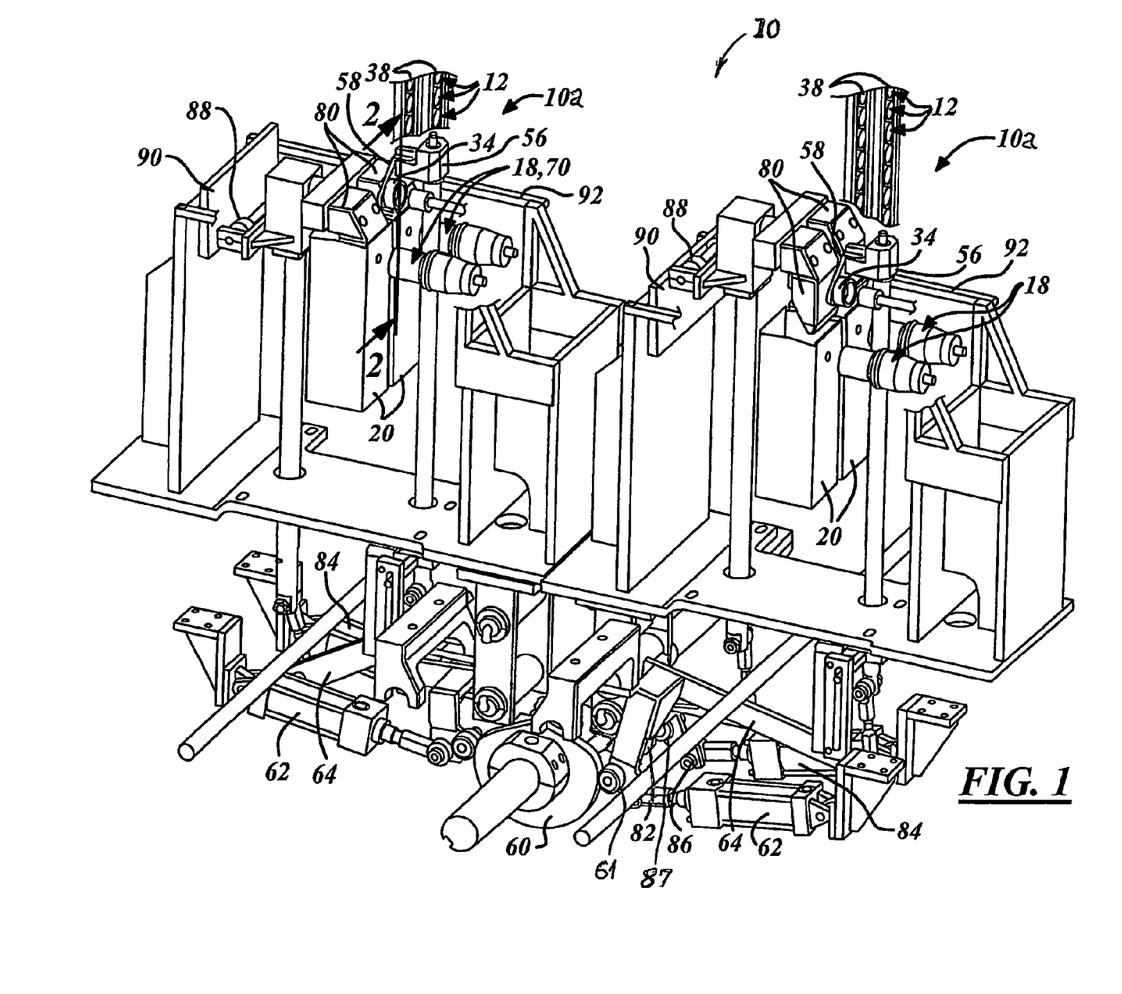
FIG. 1 is an orthogonal front view of two applicators shown disposed adjacent one another in relative positions for servicing simultaneously two carton conveyor lines associated with a form-fill-seal packaging machine, the applicators being shown with slide units removed and pour spout fitment feed tracks cut away for clarity.
Figure 2:
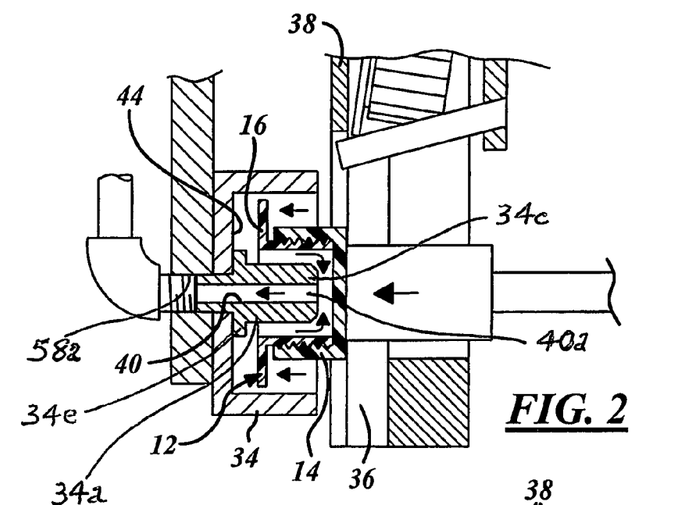
FIG. 2 is a vertical sectional view taken along the line 2-2 of FIG. 1 and showing a receiver receiving a fitment from a feed track escapement.
Figure 3:
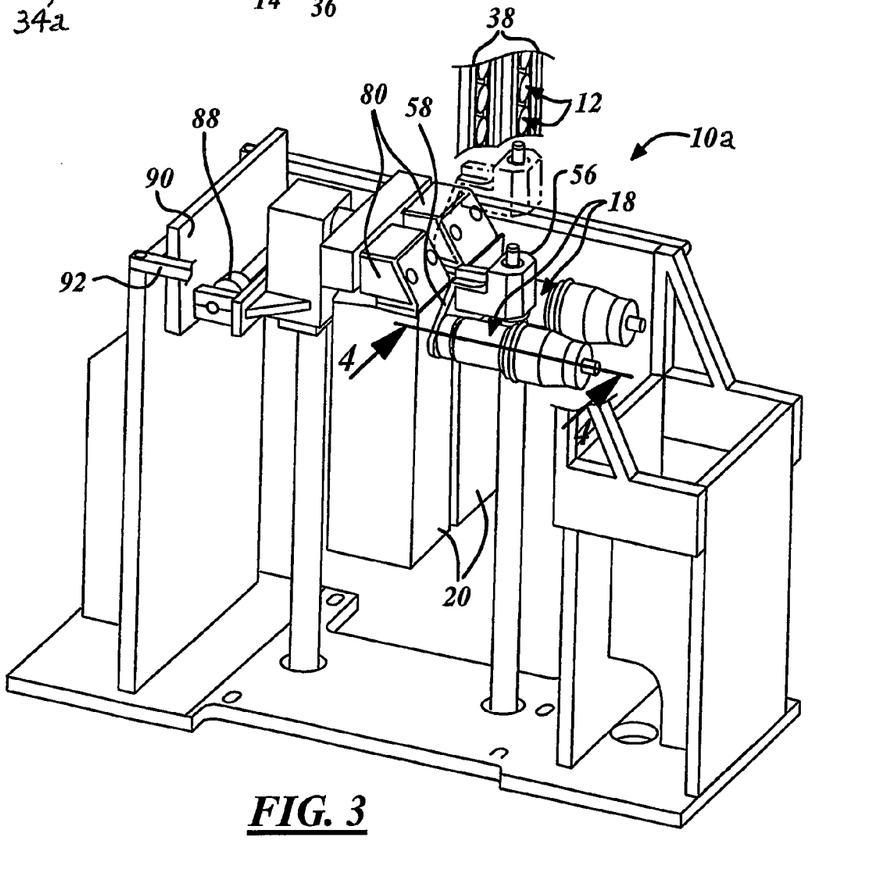
FIG. 3 is an orthogonal front view of one of the two applicators of FIG. 1 showing back-up anvils in respective lower positions and a yoke in a lower delivery position.

Referring to FIGS. 1 to 12, an apparatus for affixing pour spout fitments 12 to outer wall surfaces of plastics-coated paperboard carton walls is generally indicated at 10 in FIG. 1, in which two applicators 10a are shown installed side-by-side to provide fitment application for cartons fed by two parallel conveyors. As best shown in FIG. 2, each of the fitments 12 that the apparatus is intended to affix to carton walls includes a cap 14 screwed onto a circumferentially flanged, cylindrical pour spout 16. Each applicator 10a includes two fitment-applying devices, in this example ultrasonic sealing horns 18, slidably supported for reciprocal, axial, generally horizontal motion between respective retracted positions for receiving fitments 12 and respective advanced positions for depositing such fitments 12 on respective, outer, generally vertical, plastics surfaces of respective paperboard cartons 20 as the cartons 20 are advanced along the conveyor in a forming, fitment-applying, filling, and sealing machine. The horns 18 are shown in their respective advanced positions in FIGS. 6 and 7 and in their respective retracted positions in FIGS. 1 and 3 to 5.

Figure 4:
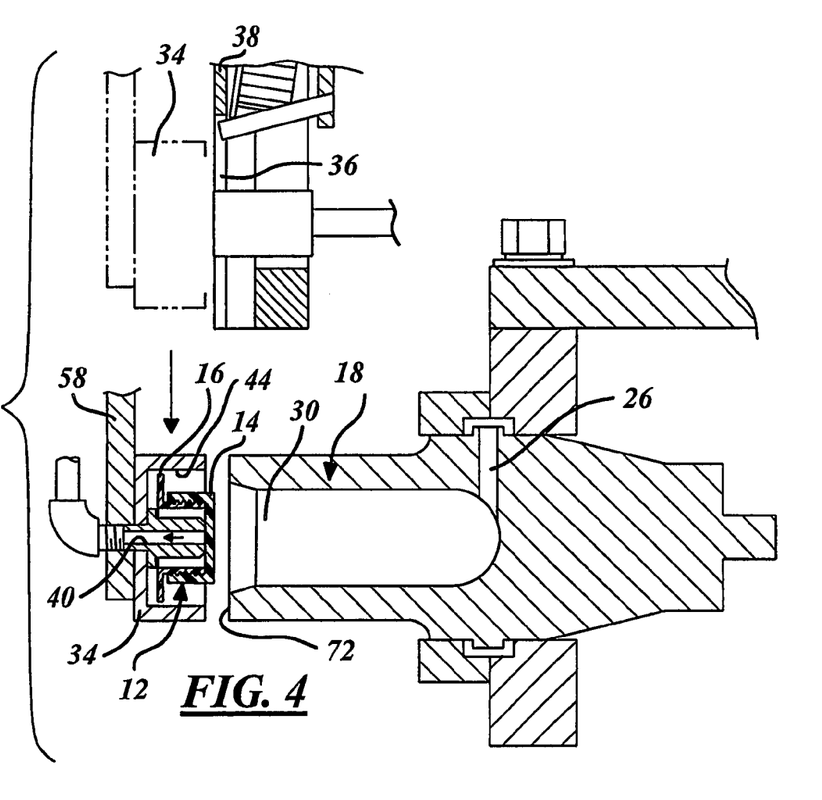
FIG. 4 is a horizontal sectional view taken along the line 4-4 of FIG. 3 and showing in full lines the receiver in a position to pass a fitment to a sealing horn, and showing in phantom the receiver in its receiving position seen in FIG. 2.
Figure 9:
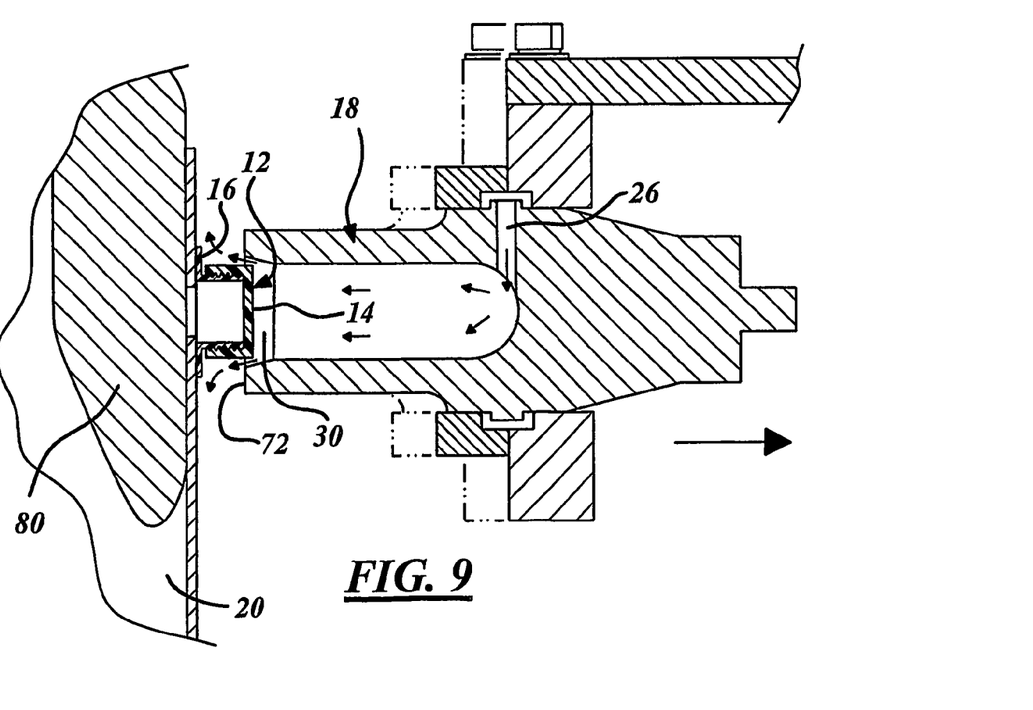
FIG. 9 is a view similar to FIG. 8, but showing the sealing horn being retracted as air is expelled past the fitment from within the sealing horn.

As shown in FIGS. 4, 5, 8, 9 and 12, a vacuum duct 26 is formed within each horn 1B and extends and provides fluid communication between a horn air handler 28 (see FIGS. 10 and 12) and a fitment holding recess 30 formed in each horn 18. The air handler 28 is actuable to evacuate the ducts 26 so as to retain fitments 12 in the recesses 30 of the horns 18 by suction, as shown in FIGS. 2 and 4, while transporting the fitments 12 to be affixed to respective carton walls. As shown schematically in FIG. 10, two pneumatic lines 32 are connected between the air handler 28 and the ducts 26 to provide fluid communication between them. The air handler 28 is further actuable to supply pressurized gas to the ducts 26 in such a way as to blow the fitments 12 from the horns 18, as shown in FIG. 9, before the horns 18 return to their respective retracted positions. This prevents the horns 18 from carrying the fitments 12 back to the respective retracted positions of the horns 18. The pressurized gas provided by the air handler 28 is sterile, for example is air passed through a high-efficiency, particulate air filter (known as HEPA air). This helps to maintain a clean, sterile atmosphere during the fitment attaching process.

As best shown in FIGS. 2, 3, 10 and 12, two receivers 34 are supported together for reciprocal, generally vertical motion between respective upper, pick-up positions for receiving fitments 12 from respective escapements 36 at respective exit ends of respective gravity feed tracks 38, and respective lower, delivery positions in axial alignment with the respective horns 18 for passing the fitments 12 to the horns 18. Each receiver 34 comprises a flanged spigot 34a and a centrally holed cup 34b. The receivers 34 are shown in their respective pick-up positions in FIGS. 1, 2, 6, and 10, and in their respective delivery positions in FIGS. 3 to 5. Once the receivers 34 have passed a pair of fitments 12 to the horns 18, the receivers 34 move out of their respective delivery positions to clear a path for the horns 18 to move laterally toward respective cartons 20 for attachment of the fitments 12, as shown in FIG. 6.

Figure 5:
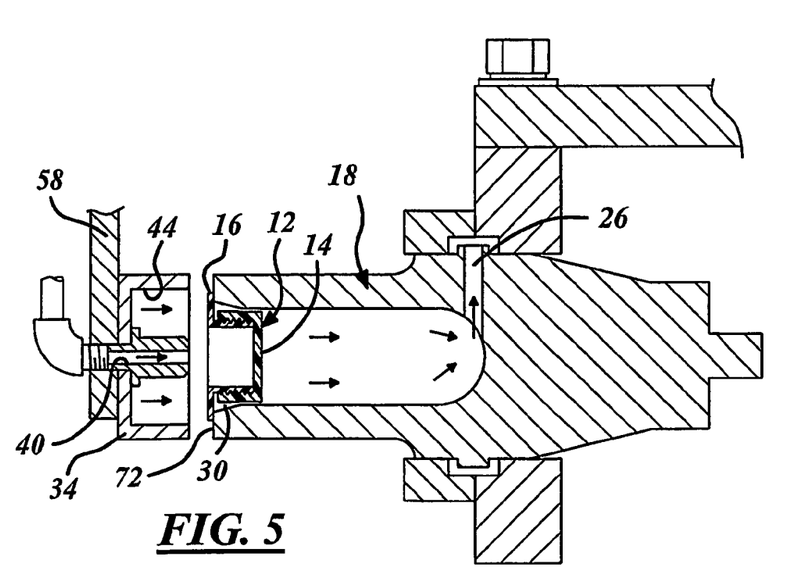
FIG. 5 is a view similar to FIG. 4, but with the fitment having been passed from the receiver to the sealing horn.
Figure 6:
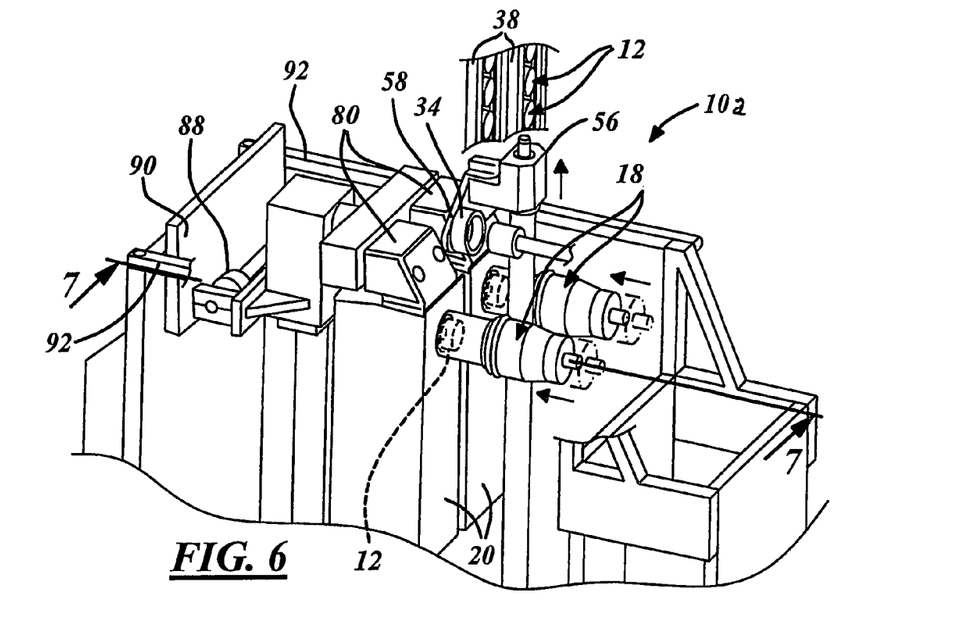
FIG. 6 is a view similar to FIG. 3, but with the yoke moved into its receiving position and the sealing horns advanced.
Figure 7:
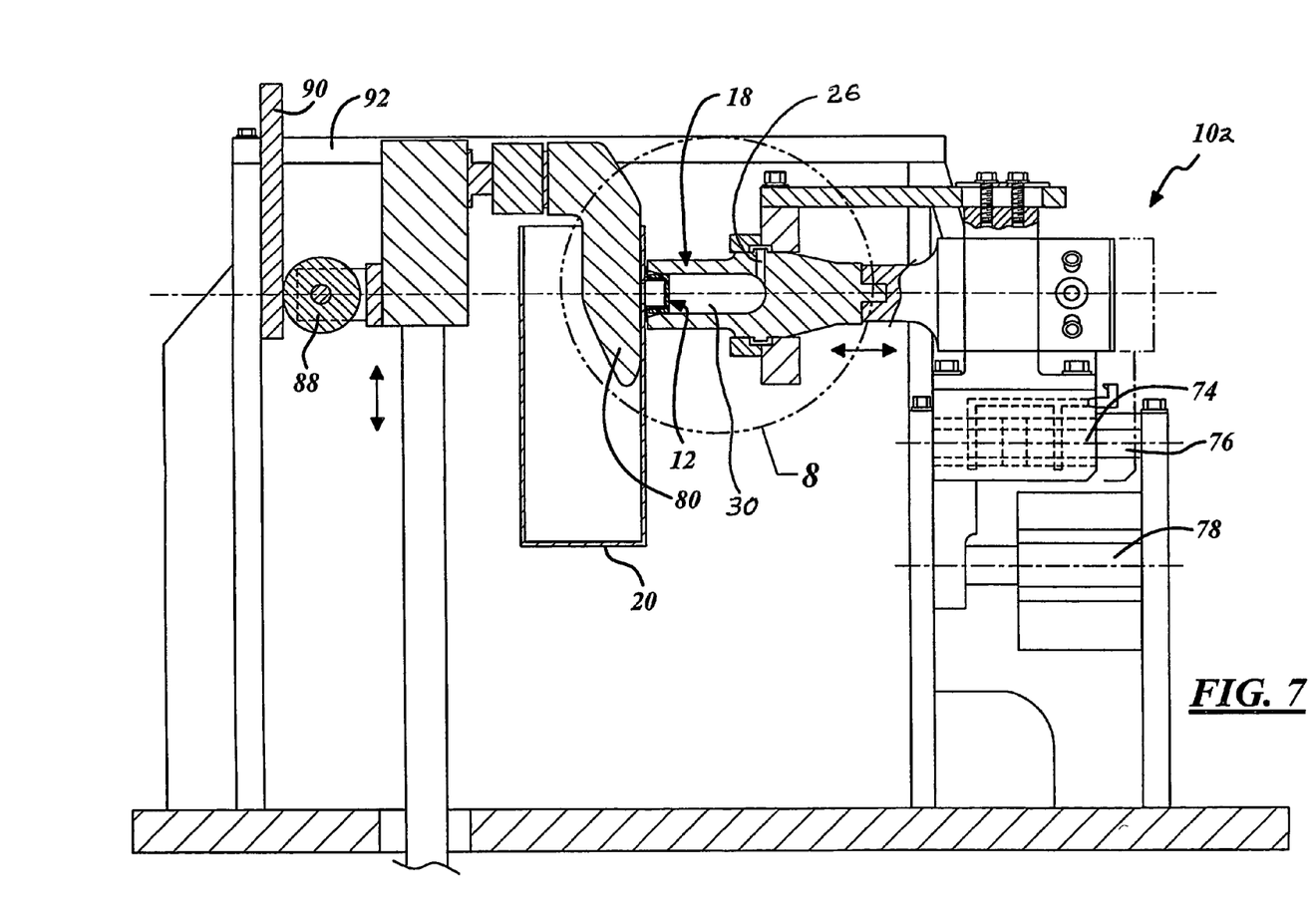
FIG. 7 is a horizontal sectional view taken along the line 7-7 of FIG. 6.
Figure 8:
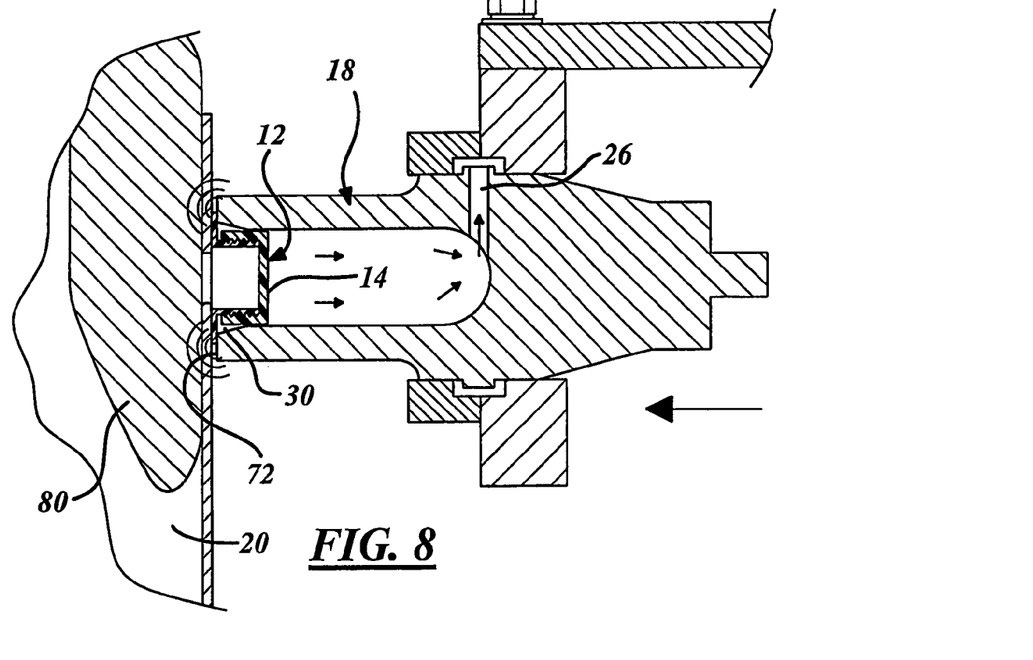
FIG. 8 is a magnified view of the region 8 of FIG. 7 and showing a fitment being ultrasonically welded to a carton.
Figure 10:
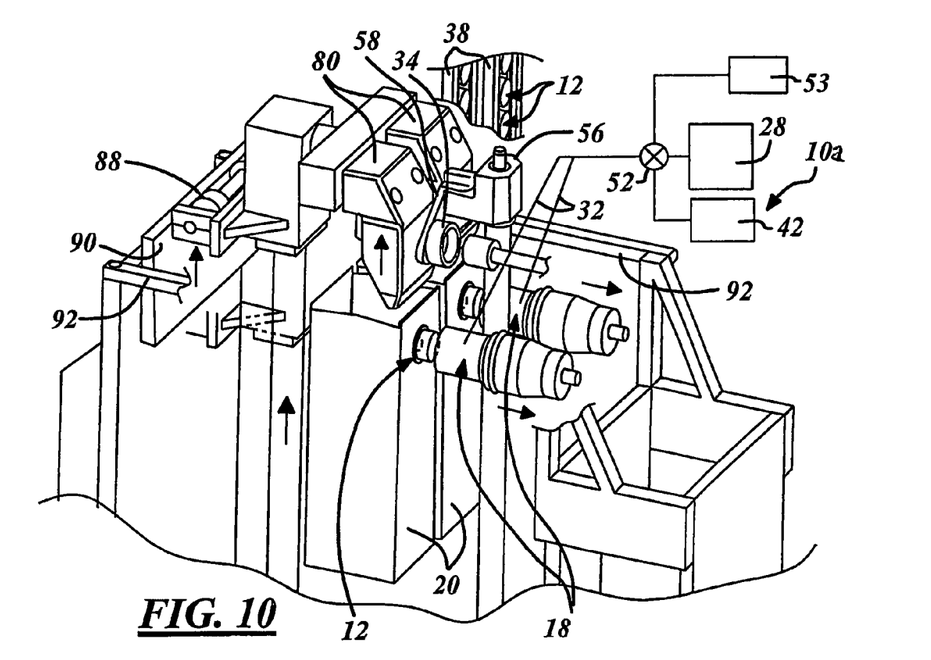
FIG. 10 is a view similar to FIG. 6, but showing the sealing horns retracting and the back-up anvils moving upward, and schematically showing other items.
Figure 11:
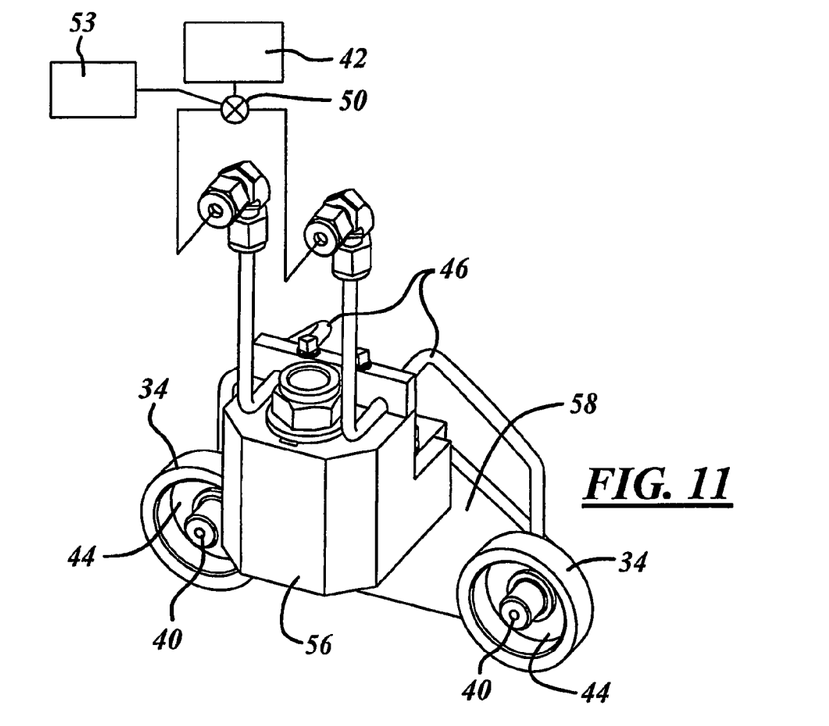
FIG. 11 is an orthogonal view of a receiver-and-yoke assembly of one of the two applicators and also shows other items schematically.

Each receiver 34 includes a spigot duct, best shown at 40 in FIGS. 2, 4, and 5, which terminates as a suction opening 40a in the free end of a circular-cylindrical head portion 34c of the spigot 34a, and which provides fluid communication between a source of HEPA air, shown schematically at 42 in FIG. 10, and respective shallow, generally cylindrical fitment receptacles 44 of the receivers 34. The fitment receptacles 44 are shaped to carry pairs of fitments 12 from the two gravity feed tracks 38 to positions where the fitments 12 can be transferred to the horn 18 for welding to the cartons 20. The spigot ducts 40 also serve to lead pressurized gas into the receptacles 44 to blow the fitments 12 from the receptacles 44 onto the horns 18, as shown in FIG. 5, when the receivers 34 are in the delivery positions aligned with the horns 18. As shown in FIG. 11, two pneumatic lines 46 are connected between, and provide fluid communication between, the source 42 of HEPA air and the spigot ducts 40. Each receptacle 44 has a generally cylindrical shape sized diametrically to fit (preferably loosely enough to take into account such things as manufacturing tolerances and small differences in the specified external diameters of the flanges) the outer edge of the circumferential flange 48 of a fitment 12 rather than fitting the interior of the pour spout of the fitment 12. This avoids damaging intricate moulded plastics parts that may exist within the fitment 12. This arrangement is further advantageous since the moulded plastics parts on the interior of certain fitments would make it very difficult to orient or hold such fitments 12 from the insides of their spouts.

A receiver flow control valve, shown schematically at 50 in FIG. 11, is connected between the source 42 of HEPA air and each spigot duct 40 and is operable to block and allow alternately the flow of HEPA air from the source 42 through the spigot ducts 40 to the fitment receptacles 44.

Figure 12:
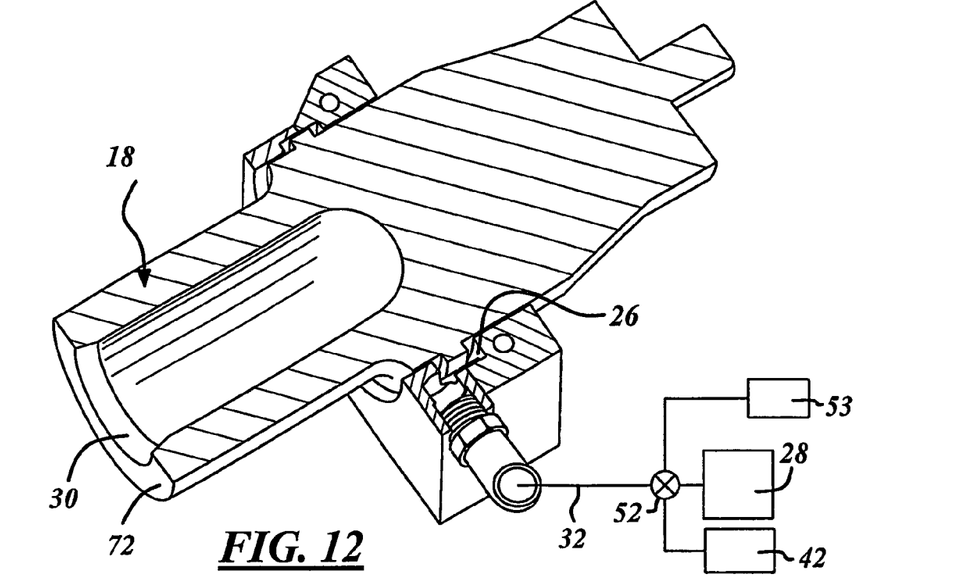
FIG. 12 is an orthogonal sectional view of a sealing horn of one of the two applicators and again shows other items schematically.
Figure 13:
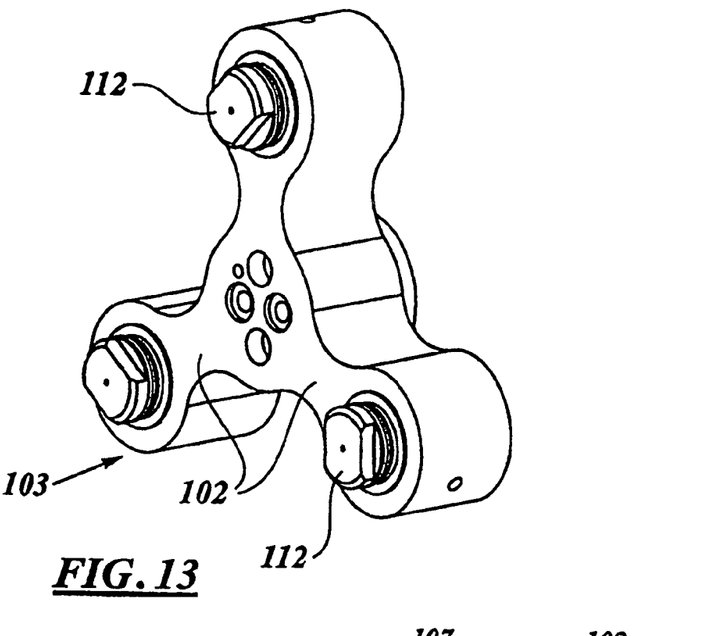
FIG. 13 is a front perspective view of a rotatable and translatable member of a modified version of such applicator.
Figure 14:
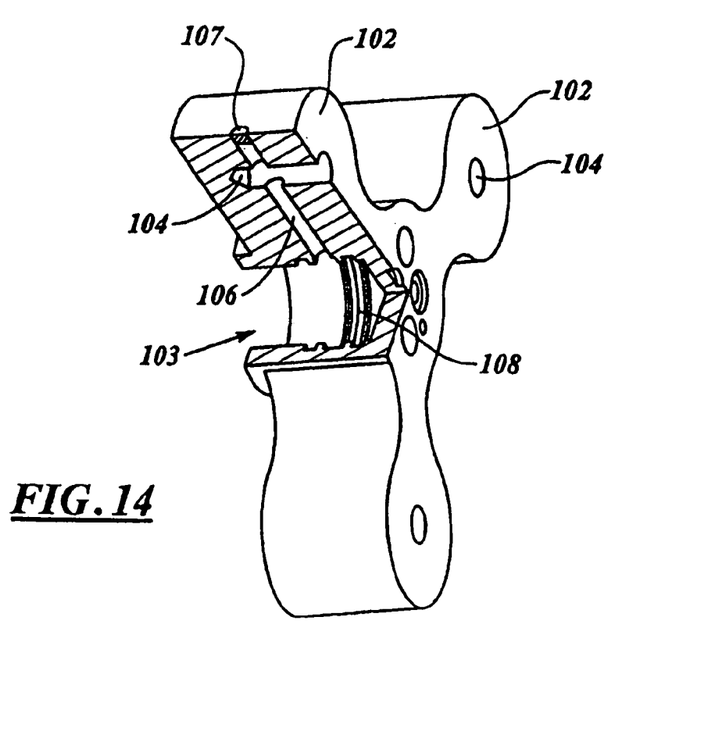
FIG. 14 is a partially sectional front perspective view of the member, but with three identical spigots thereof omitted.
Figure 15:
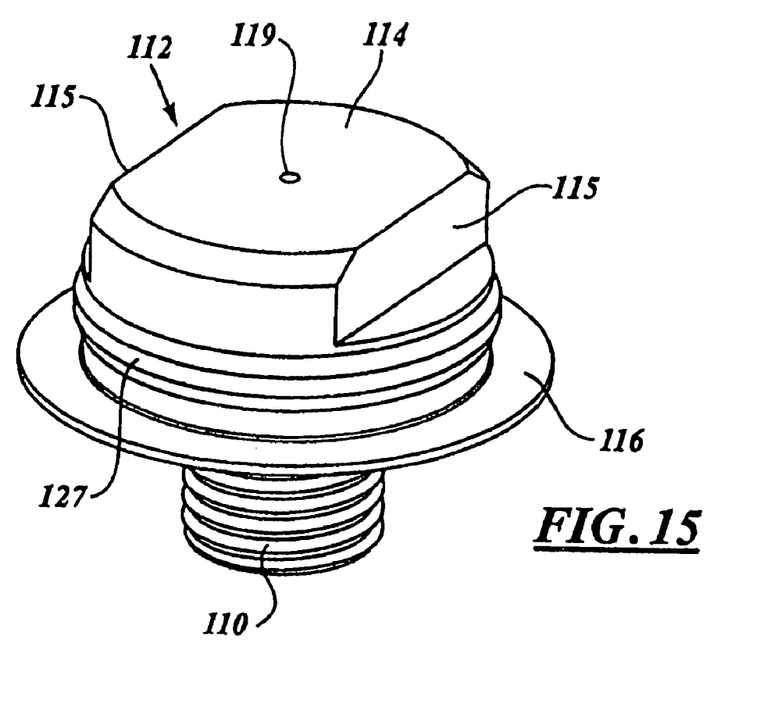
FIG. 15 is a front perspective view of one of the three spigots.
Figure 16:
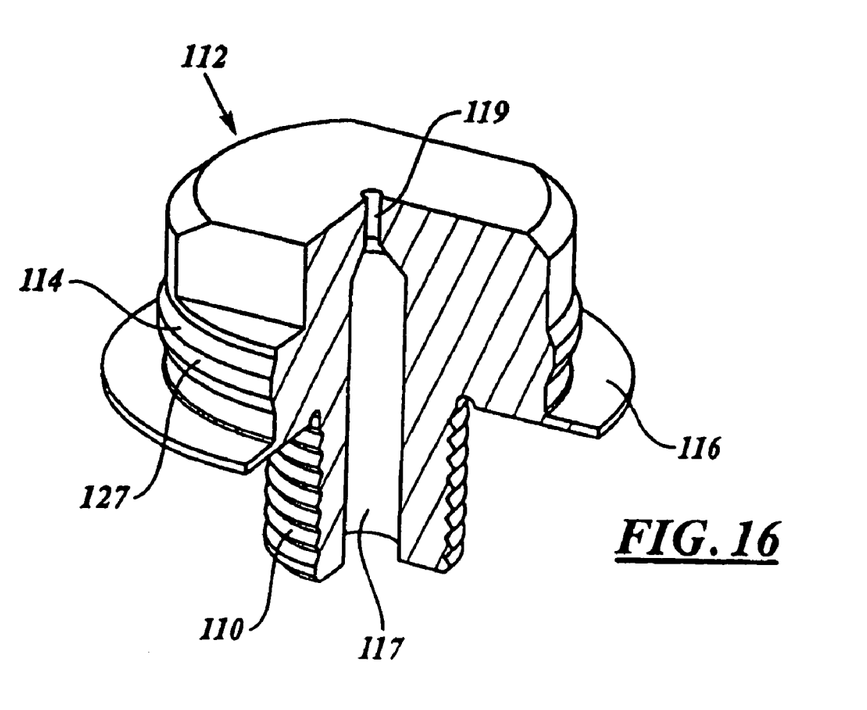
FIG. 16 is a partially sectional front perspective view of that spigot.

As shown schematically in FIGS. 10 and 12, the air handler 28 includes a control valve 52 connected between the ducts 26, the HEPA air source 28, and a vacuum source 42, and is operable either to evacuate, or to provide HEPA air to, the fitment-holding recesses 30. A programmable logic controller (PLC) 53 is programmed to control the timing of vacuum application to the receptacles 44 and the timing of vacuum application and positive pressure gas application to the recesses 30 of the horns 18. The PLC 53 is connected to the receiver flow control valve 50 and the horn flow control valve 52 and is programmed to command the valve 52 to evacuate the ducts 26 and to command the valve 50 to provide pressurized gas in the ducts 40 when the receivers 34 are in the delivery positions such that the fitments 12 will be drawn to the horns 18 as they are blown from their respective receivers 34.

A yoke 56 supports the receivers 34 on a triangular holder plate 58 for generally vertical reciprocal motion between the pick-up positions and the delivery positions of the receivers 34. A yoke drive cam, shown at 60 in FIG. 1, drives the yoke 56 through its generally vertical reciprocal motion. Each spigot 34a is screwed into a threaded bore 58a through the plate 58 and has, at that end of its head portion 34c nearer the plate 58, a flange-form ring portion 34e whereby the cup 34b is clamped to the plate 58.

A yoke drive air spring actuator, shown at 62 in FIG. 1, is drivingly connected to the yoke 56 through a yoke drive linkage arm 64 and is actuable to hold a cam follower roller 61 on the yoke drive linkage arm 64 in engagement with the yoke drive cam 60 when cartons 20 are present. The yoke drive actuator 62 is also actuable to retract the cam follower roller 61 to a position out of engagement with the yoke drive cam 60 when cartons 20 are not present. This arrangement prevents the yoke 56 and the receivers 34 from operating when there are no cartons 20 present.

The ultrasonic sealing horns 18 have rigid annular horn faces 72 generally co-extensive with the flanges of the fitments 12 that the horns 18 are to affix to the cartons 20. The ultrasonic horns 18 are supported for lateral reciprocal motion on a slide unit shown at 74 in FIG. 7. The slide unit 74 is driven along parallel shafts 76 between the retracted and advanced positions by a slide unit air cylinder 78.

Two back-up anvils 80 are supported together for generally vertical motion between respective upper, retracted positions clear of the open tops of adjacent cartons 20 on the conveyor and respective lower, inserted positions within the open tops of the cartons 20. The anvils 80 are shown in their retracted positions in FIG. 10 and on the right in FIG. 1 and in their inserted positions in FIGS. 3, 6, and 7 and on the left in FIG. 1. On the down stroke from the retracted position to the inserted position, the two back-up anvils 80 enter two adjacent cartons 20 that have been indexed into place along the conveyor into a position to have the fitments 12 affixed to their outer surfaces. The back-up anvils 80 are shaped and positioned to hold the shapes of the cartons 20 and to back up respective walls of the cartons 20 against lateral loads that the horns 18 will apply while ultrasonically welding the fitments 12 onto the cartons 20.

A back-up anvil drive includes a back-up anvil drive cam shown at 82 in FIG. 1. The cam 82 drives the two back-up anvils 80 through their reciprocal, generally vertical motion. The back-up anvil drive also includes a back-up anvil drive air spring actuator 84 which is drivingly connected to the anvils 80 through a drive linkage arm 86 and is actuable to hold a cam follower roller 87 on the arm 86 in engagement with the cam 82 when cartons 20 are present on the conveyor. The actuator 84 is also actuable to retract the anvils 80 by retracting the cam follower roller 87 to a position out of contact with the cam 82 when cartons 20 are not present. As with the yoke drive, the back-up anvil drive is thus disabled when cartons 20 are not present.

Two coaxially mounted rollers 88 support the back-up anvils 80 against a generally vertical back-up plate 90 positioned so that the rollers 88 will follow the plate 90 and will help guide the vertical motion of the anvils 80 and positively position and support the anvils 80 against the lateral sealing load that the sealing horns 18 apply. The plate 90 is rigidly connected to the slide unit 74 by bars 92, further to support the anvils 80 against the lateral sealing load. In other words, the bars 92 allow the lateral sealing load that is generated during welding to be captive in that system by transferring the load through the back-up plate 90, the rollers 88, and the slide unit 74.

In practice, the fitments 12 may be affixed to outer wall surfaces of plastics-coated paperboard cartons 20 being indexed by a conveyor in a forming, fitment-applying, filling, and sealing machine, by first pushing the fitments 12 from the gravity feed tracks 38 into the corresponding receivers 34, where the fitments 12 are retained within the receptacles 44 by suction. The yoke 56 then carries the fitments 12 downward until the fitments 12 are axially aligned with the ultrasonic horns 18. A puff of HEPA air from the ducts 40 blows the fitments 12 from the receivers 34 and into the ultrasonic horns 18. When the fitments 12 are blown from the receivers 34 into the ultrasonic horns 18, a vacuum is applied to the fitment holding recesses 30 of the ultrasonic horns 18 through the applicator ducts 26 to hold the fitments 12 in the horns 18. In other words, the fitments 12 are held in place by means of a vacuum. The yoke 56 is then indexed upwards to clear the way for the ultrasonic horns 18 to advance. Once a pair of cartons 20 has been indexed into position for fitment attachment along the conveyor, the back-up anvils 80 are lowered into the cartons 20. The horns 18 then slide axially and laterally towards the cartons 20 and ultrasonically weld the circumferential flanges of the fitments 12 to the outside wall surfaces of the cartons 20.

After securing of the fitments 12 to the cartons 20, the horn control valve 52 of the air handler 28 may be actuated to switch from vacuum to positive pressure HEPA air to help remove the fitments 12 from the horns 18. Positive air flow may also be maintained through the horns 18 when the apparatus 10 is run for extended periods, whereby the horns 18 are cooled to prevent the fitments 12 from sticking in the recesses 30 of the horns 18 after the fitments 12 have been welded to the cartons 20. Finally, the horns 18 retract and the sequence begins again with the pushing of an additional pair of fitments 12 from the feed tracks 38 into the receivers 34.

Referring to FIGS. 13 to 17, each of a plurality of rotary arms 102 (in this example three arms 102) of the rotatable and translatable member 103 is formed with a horizontal, internally threaded, blind bore 104. The bore 104 is in communication with a radial, central bore 106 of the arm 102 closed at its outer end by a plug 107 and communicating at its inner end with an annular groove 108 in communication, via bores in an axle (not shown) of the member 103, with a vacuum source. Into each bore 104 is screwed an externally threaded, tubular portion 110 of a spigot 112 to attach the spigot firmly to the arm 102. Each spigot 112 also includes a circular-cylindrical head portion 114 with diametrically opposite flats 115, and a flange-form ring portion 116 co-axial with the head portion 114 and the tubular portion 110 and projecting radially outwards from that end of the head portion 114 nearer the arm 102. The flats 115, which extend over only an upper part of the height of the head 114, permit use of a spanner to screw the spigot 112 firmly onto the arm 102 and to unscrew it therefrom. Each spigot 112 is formed co-axially with a bore 117 terminating, at the flat front surface of the spigot, in a restricted opening 119. The member 103 is not only rotatable about a horizontal axis A shown in FIG. 17 but also reciprocable along that axis. In the condition shown in the drawing, the arm 102 has reached a position in which the spigot 112 is co-axial with an ultrasonic welding horn 118 which is horizontally reciprocable. The free end of the horn 118 is formed co-axially with a circular-cylindrical recess 120 which is of an internal diameter slightly greater than the external diameter of the ring portion 116. At a position above the level of the axis A, the head portion 114 is inserted into a plastics, screw-threaded, pour spout fitment 122 consisting of an internally threaded cap 124 and a flanged, externally-threaded, pour spout 126, with a tamper-evident feature (not shown) in the region where the rim of the mouth of the cap 124 is adjacent to the flange 128 of the pour spout 126. From the moment that the head portion 114 is inserted into the fitment 122 until the fitment attains a welded-on condition, it is retained on the portion 114 by the suction emanating from the opening 119.

Figure 17:
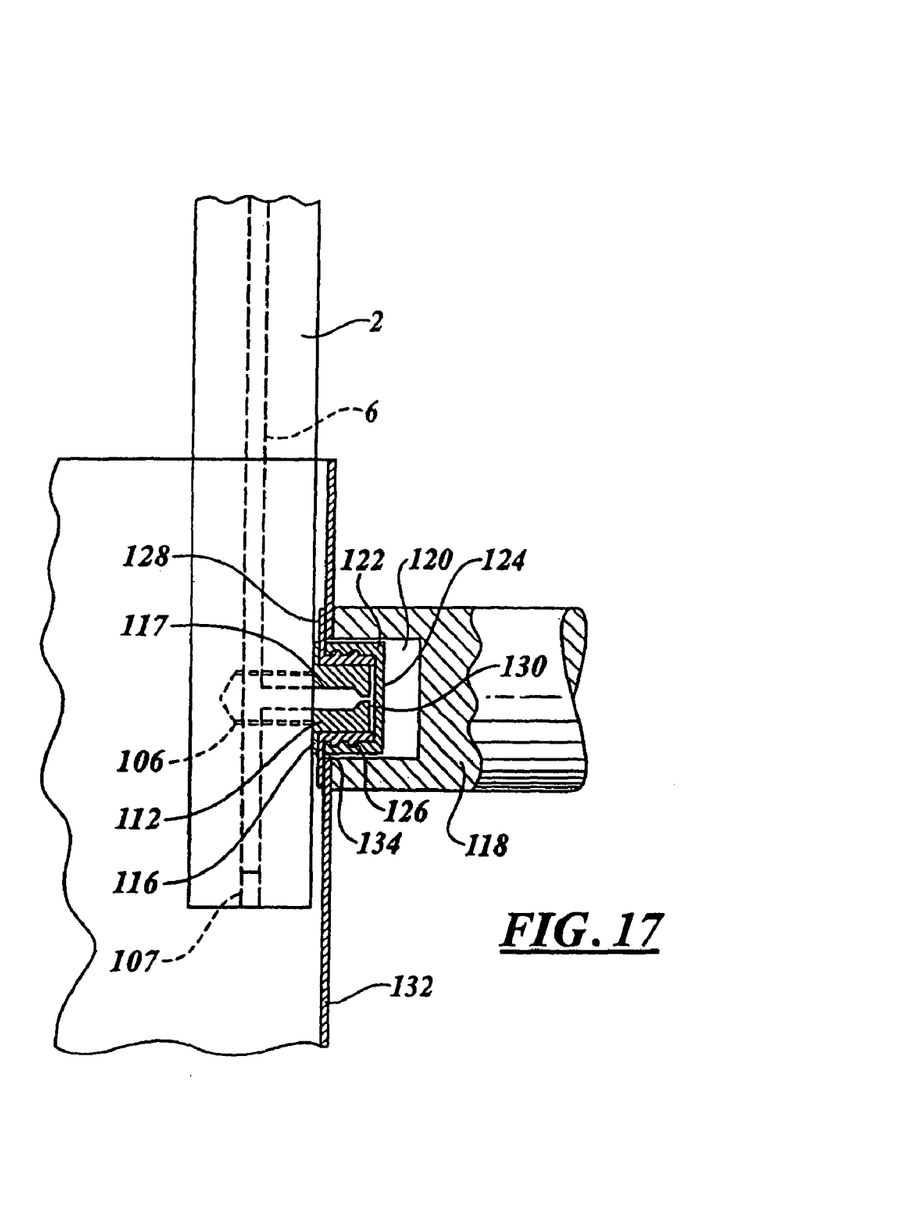
FIG. 17 illustrates in side elevation and partly in vertical section a stage in the welding of a screw-threaded pour spout fitment to a carton by the modified version of the applicator.

To promote the effect of this suction, the lower part of the portion 114 is formed with an annular rib 127 over which the spout 126 is a press fit, to minimize leakage of ambient air into that part of the interior of the fitment 122 in communication with the opening 119. For each spigot 112, the suction may either be continuous, in which case the suction force on the fitment 122 should not be so great as significantly to resist withdrawal of the spigot 112 from the fitment 122 after application of the horn 118 thereto, or be intermittent, in particular be released once the horn 118 has been applied. An annular, radially inner portion of the flange 128 bears against, and is co-extensive with, the ring portion 116, whilst the remaining, annular, radially outer portion of the flange 128 protrudes radially beyond the ring portion 116 at a spacing from the arm 102. With the head portion 114 fully inserted into the fitment 122, there is also a spacing 130 between the free end surface of the spigot 112 and the facing, substantially planar internal surface of the cap 124. Once the fitment 122 has been fully loaded onto the head portion 114, the arm 102 is displaced to the left along the axis A and is then rotated to a substantially vertical position in which the spigot 112 is substantially in a vertical plane containing the axis A. This brings the lower end of the arm 102 and, with it, the spigot 112 and the fitment 122 into the interior of a carton 132 comprised of paperboard coated on both faces with thermoplastics, possibly with the interposition of a gas barrier layer. Then the arm 102 is displaced to the right along the axis A to bring the arm 102, the spigot 112 and the fitment 122 into the condition shown in FIG. 17, in which the head portion 114 and the screw-threaded part of the fitment 122 have been introduced through a hole 134 through the wall of the carton 132 until the flange 128 comes to bear against the inside surface of the wall, as seen in FIG. 17. Then the ultrasonic horn 118 is moved to the left until it vibratingly presses the carton wall and the annular, radially outer portion of the flange 128 against an annular surface portion of the arm 102, the head portion 114, the ring portion 116 and the screw-threaded part of the fitment 122 being received with clearance in the recess 120. FIG. 17 shows the horn 118 in an intermediate position of this movement, in which it has just come to bear against the outside surface of the carton wall. The vibrational pressing together, between the arm 102 and the horn 118, of the carton wall and the annular, radially outer portion of the flange 128 welds the flange 128 securely to the thermoplastics coating at the inside surface of the wall of the carton 132. Then the arm 102 moves away to the left along the axis A and the horn 118 moves away to the right along the axis A and thereafter the arm 102 is turned out of the open top of the carton 132, whereafter the carton is advanced from the fitment-application station (partially represented in the drawing) to filling and sealing on the form-fill-seal packaging machine.

It will be understood that the axis of rotation A need not be horizontal but can be in any other orientation desired.

We claim:

1. Apparatus for use in attaching cap-form fitments to containers, comprising a support, a head projecting transversely from said support and adapted to receive said fitments in turn over a free end portion thereof, a suction opening formed in said free end portion for communicating with at least parts of the interiors of said fitments, which parts are bounded by respective end walls of said interiors, ducting connected to said suction opening and whereby suction is produced in said suction opening, and a cup substantially co-axially encircling said head and adapted to receive closely therein a flange of each of said fitments.

2. Apparatus according to claim 1, wherein said head is of a spigot screwed into said support and said spigot has co-axially thereof a flange-form ring portion at that end of said head opposite said free end portion, said cup is centrally holed whereby said spigot extends therethrough, and said ring portion clamps said cup relative to said support.

3. Apparatus according to claim 1, wherein the maximum external width of said head is just slightly undersized relative to the minimum expected internal width of the fitments.

4. A method of applying cap-form fitments to respective containers, including causing the fitments to be received in turn over a free end portion of an element in the form of a head which projects transversely from a support, and producing suction between a suction opening formed in said free end portion and an end wall of the interior of said fitment, thereby to promote retention of said fitment on said end portion, said causing being accompanied by causing a flange of said fitment to be closely received in a cup encircling said element, and said producing being accompanied by producing suction between a base wall of said cup and said flange.

5. A method according to claim 4, wherein said suction is continuous and the suction force on said fitment is not so great as significantly to resist withdrawal of said fitment from said element.

* * * * *